United States Patent
Koizumi et al.

[11] 3,791,806
[45] Feb. 12, 1974

[54] CONTINUOUS PRODUCTION OF LIGHT-CONDUCTING GLASS FIBERS WITH ION DIFFUSION

[75] Inventors: Ken Koizumi, Kawanishi; Yoshiro Ikeda, Nishinomiya; Mitsugi Yoshiyagawa, Takarazuka, all of Japan

[73] Assignee: Nippon Selfoc Kabushiki Kaisha a/k/a Nippon Selfoc Co., Ltd., Tokyo, Japan

[22] Filed: Dec. 28, 1970

[21] Appl. No.: 101,573

[30] Foreign Application Priority Data
Dec. 30, 1969   Japan.................................. 44-424

[52] U.S. Cl................................ 65/3, 65/4, 65/30, 65/121, 65/60, 65/DIG. 7, 350/96
[51] Int. Cl....C03c 25/02, C03b 5/26, C03c 15/00
[58] Field of Search.... 65/DIG. 7, 30, 4, 3, 121, 60; 350/96

[56] References Cited
UNITED STATES PATENTS

| | | | |
|---|---|---|---|
| 2,992,517 | 7/1961 | Hicks, Jr................................ | 65/4 X |
| 3,146,082 | 8/1964 | Hicks, Jr. et al..................... | 65/61 X |
| 3,428,475 | 2/1969 | Teeg .................................... | 65/DIG. 7 |
| 3,614,197 | 10/1971 | Nishizawa................................ | 65/4 |
| 3,083,123 | 3/1963 | Navias ............................. | 65/DIG. 7 |
| 3,320,114 | 5/1967 | Schulz.................................... | 65/30 X |
| 3,486,808 | 12/1969 | Hamblen............................. | 65/30 X |
| 3,582,297 | 6/1971 | Lakeman ..................................... | 65/4 |
| 3,625,686 | 12/1971 | Kitana................................. | 65/DIG. 7 |
| 3,607,322 | 9/1971 | Brady et al. ...................... | 65/DIG. 7 |
| 3,395,994 | 8/1968 | Cuff......................................... | 65/30 |

*Primary Examiner*—Frank W. Miga
*Attorney, Agent, or Firm*—Robert E. Burns; Emmanuel J. Lobato

[57] ABSTRACT

In a process for continuously producing a light conducting glass fiber wherein the refractive index in a plane perpendicular to the optical axis of the glass fiber is so distributed that it continuously decreases outward from a certain value at the center toward the peripheral portion, a first kind of glass containing ions having a greater degree of contribution to the refractive index is drawn, in molten state from a central orifice to form the core portion of the glass fiber, and another kind of melted glass containing ions having less contribution to the refractive index is drawn from a second orifice to form an outer coating layer of the glass fiber, the tip of the first central orifice being located at a retracted position compared to that of the second orifice with respect to the drawn direction of the melted glasses, whereby thermal mutual diffusion of these ions is caused to occur through a boundary surface between two kinds of glasses located mainly in the distance portion between the tips.

5 Claims, 3 Drawing Figures

CONTINUOUS PRODUCTION OF LIGHT-CONDUCTING GLASS FIBERS WITH ION DIFFUSION

BACKGROUND OF THE INVENTION

This invention relates generally to light-conducting glass structures and more particularly to a process for continuously producing a light-conducting glass structure having a continuously varying refractive index distribution in planes perpendicular to the optical axis of the glass structure.

Recently, intense research has begun on transmission paths for light-communication using laser-light. For instance, a light-conducting glass fiber or glass bar (hereinafter referred to as focusing light-conducting fiber) is described in the preprint S5-5, page 70, for the national convention of Denshi Tsushin Gakkai (the Japan Electronic Communication Society) in 1969, as having a region in the vicinity of its central axis having a distribution of refractive index in a transverse plane perpendicular to the optical axis of the fiber wherein the index decreases in proportion to the second power of distance measured from the central axis. The principal advantages of which are that it is almost completely free of effects due to the outer atmosphere and that the glass fiber can be bent freely whenever necessary.

Furthermore, the fundamental method for producing this light-conducting glass fiber is also disclosed in U.S. Pat. Application Ser. No. 806,368, filed on Mar. 12, 1969 now abandoned in favor of continuation application Ser. No. 147,256 filed May 26, 1971. In accordance with this method, ion exchange is caused between the glass and a molten salt bath, or mutual diffusions of cations are caused between two kinds of glasses having different compositions, so that a desired distribution of concentration of modifying oxides is obtained by way of the thermal diffusion of cations. However, the process disclosed in the above mentioned Patent Application Ser. No. 806,368 requires a considerably long period for the mutual diffusions of cations.

SUMMARY OF THE INVENTION

Therefore, the primary object of the present invention is to provide an improved process for continuously producing a light-conducting glass fiber of the above described nature.

Another object of the present invention is to provide an improved process for producing a light-conducting glass fiber, wherein the comparatively long period required for the mutual diffusions of cations in the conventional method is substantially shortened.

Still another object of the present invention is to provide an improved process for producing a light-conducting glass fiber wherein the steps for stretching the glass fiber and for causing mutual diffusions are combined into one step.

Still another object of the present invention is to provide an improved process for producing a light-conducting glass fiber, wherein the inner core portion and an outer layer of the glass fiber are drawn from an inner nozzle and an outer annular nozzle, respectively.

An additional object of the present invention is to provide an improved process for producing a light-conducting glass fiber, wherein a plurality of inner core portions are formed by a plurality of nozzles located inwardly from the annular nozzle for forming the outer layer of the glass fibers.

A further object of the present invention is to provide an improved process for producing a light-conducting glass fiber, wherein the tip of a central nozzle for producing the inner core portion of the glass fiber is located at a retracted position relative to the tip of an outer annular nozzle from which the outer coating layer of the glass fiber is produced, whereby a mutual thermal diffusion of ions contained in these two portions of the glass fiber is mostly caused through the boundary surface between the two portions in the region between the tip of the central nozzle and the tip of the annular nozzle.

The above described and other objects of the present invention can be achieved by an improved method for producing a light-conducting glass fiber, which comprises the steps of drawing a molten glass contained in a first reservoir and containing ions having a greater degree of contribution to the refractive index through a central nozzle connected to the outlet of the first reservoir so that a core portion of the glass fiber is thereby formed, ejecting a melted glass contained in a second reservoir and containing ions having a lower degree of contribution to the refractive index from an annular nozzle connected to the outlet of the second reservoir for coating the core glass continuously, the tip of the contral nozzle being located at an axially retracted position relative to the tip of the annular nozzle, whereby a mutual thermal diffusion of ions having a greater degree of contribution to the refractive index and ions having a lower degree of contribution to the refractive index is caused through the boundary surface of these two kinds of glasses located in the retion between these two tips.

The nature, principle, and utility of the invention will be better understood from the following detailed description of the invention when read in conjunction with the accompanying drawings.

DETAILED DESCRIPTION OF THE INVENTION

Figure 1:
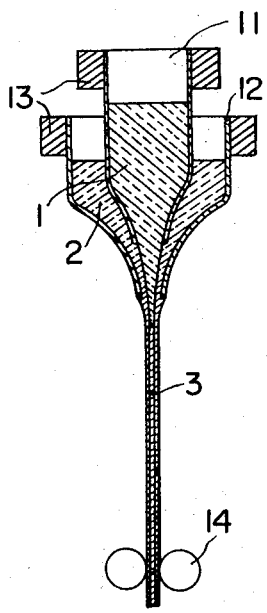
FIG. 1 is a longitudinal sectional view indicating one example of a process for producing a light-conducting fiber according to the present invention.

In accordance with a prefereed embodiment of the invention, two kinds of nozzles are arranged so that one is disposed at the center and the other of annular form is disposed coaxially around the first nozzle. Melted glasses of different compositions, one of which contains ions producing a greater contribution to the refractive index such as Tl ions and the other of which contains ions producing less contribution to the refractive index such as Li, Na, K, Rb, and Cs, are sent through these inner and outer nozzles, respectively, so that a glass fiber consisting of two layer regions is thereby formed.

In this glass fiber, mutual diffusion of ions are caused through the boundary surface between the two layers, and a distribution of refractive index in a plane perpendicular to the optical axis of the glass fiber wherein the index continuously decreases from a certain value at the center of the glass fiber outward to the peripheral portion of the fiber can be thereby obtained.

The process according to the present invention is therefore carried out in such a manner that a first melted glass containing ions producing a greater contribution to the refractive index, such as Thallium ions, is placed in a first reservoir connected to the central nozzle, and a second melted glass containing ions producing less contribution to the refractive index, such as Li, Na, K, Rb, or Cs, is placed into a second reservoir connected to the annular nozzle, whereby the melted glass flowing out of the annular nozzle continuously coats the other kind of glass flowing out of the central nozzle.

In this case, the lower tip of the central nozzle is located at a position higher than the lower tip of the annular nozzle, and through the boundary surface thereby formed between the first kind of glass and the second kind of glass in the cylindrical region between the tips of the two kinds of nozzles, mutual thermal diffusion of the ions producing a greater contribution to the refractive index and ions producing less contribution to the refractive index occurs whereby a distribution of the refractive index, in a cross sectional plane perpendicular to the optical axis of the glass fiber, wherein the index decreases progressively from the center of the glass fiber to the peripheral portion thereof can be obtained.

Some mutual heat diffusion also occurs in the glass drawn from the annular nozzle.

The axial distance or length from the tip of the annular nozzle to the tip of the central nozzle is different depending on the diameter of the glass fiber to be produced and also on the refractive index distribution desired. However, this distance is generally made more than 2 mm. and preferably 5 mm. or more.

In the present invention, the distance or length between the tip of the center nozzle and the tip of the annular nozzle is preferably controlled in consistant with the following condition. That is to say, said distance is controlled to form such a distribution of the refractive index that mutual diffusion of the ions through boundary surface between the core glass drawn from the central nozzle and the coating glass contacted with said central nozzle decreases in proportion to about the square of the distance from the central axis, in a cross sectional plane perpendicular to the optical axis of the obtained glass fiber, particularly at least near the central axis.

In the process in accordance with the present invention, the number of the central nozzles may be one as described above or may be more than one, the nozzles then being arranged in parallel. In the latter case, each of the core glasses flowing out of the plurality of central nozzles is separated from the others and surrounded separately by the second kind of glass flowing out of the annular nozzle. In the latter case also, mutual diffusions of ions occur between the two kinds of glasses through the boundary surfaces.

When monovalent cations, which can be mutually diffused through the boundary surface, are considered, and when these cations are enumerated sequentially in the order of their degree of contribution to the refractive index, starting with the cation of greatest contribution, the order of Tl, Li, K, Na, and Rb is obtained. Between K, Na, and Rb, there are no significant differences in their contribution to the refractive index.

Furthermore, when the core glass and the coating glass are selected to cause mutual diffusion of divalent cations, the divalent ions may be arranged as Pb, Ba, Cd, Sr, Ca, Zn, Be, Mg, in accordance with their degree of contribution to the refractive index, that is, successively from the divalent ions having larger contribution to those having smaller contribution.

In accordance with the present invention, the steps whereby the desired distribution of refractive index is obtained and the composite structure of the glass fiber is formed are unified into one step, and whereby not only the period required for the processes can be minimized, but the production apparatus for the glass fiber can be simplified.

Referring now to FIG. 1 indicating an example the production process according to the present invention, the core glass 1 is a melted glass containing Tl ions and composed, in mol percent, of, for instance, 70.3% of $SiO_2$, 17.0% of $Na_2O$, 3.3% of $Tl_2O$, and 9.4% of PbO, the refractive index of the glass being 1.60. The melted core glass 1 is contained in a pot 11 constituting the aforementioned first reservoir. Another kind of melted glass 2 for forming a peripheral coating layer or sheath around the core glass 1 contains at least one kind of ion selected from Li, Na, K, Rb, and Cs and is composed, in mol %, of, for instance, 70.5% of $SiO_2$, 17.0% of $Na_2O$, 3.5% of $K_2O$, 9.0% of PbO, the refractive index of the glass being 1.56. The melted glass 2 for the coating layer is contained in a pot 12 constituting the second reservoir.

Heaters 13 are provided for the two pots 11 and 12 to keep the glasses contained in these pots in the molten condition. While these heaters 13 are preferably of an electric type, other types of heaters of course, may also be used.

The lower portion of the pot 11 is narrowed into a constricted tip forming a central nozzle, and the lower portion of the pot 12 is narrowed into a constricted tip forming an annular nozzle concentrically surrounding the molten core glass 1 pouring out of the central nozzle. With the above described arrangement, the molten glass 1 flowing out of the central nozzle is constricted and formed into the core portion of a glass fiber, and the molten glass 2 flowing out of the annular nozzle is constricted and formed into the outer coating layer or sheath of the same glass fiber.

For the purpose of elongating the time period during which the two kinds of glasses in molten state are maintained in contacting condition such that the mutual diffusion of cations are caused to establish a desired distribution of the refractive index, the outer annular nozzle is disposed in an axially position lower than the central nozzle. More specifically, the outer annular nozzle is axially extended further downstream beyond the central nozzle so that the annular nozzle encloses the central nozzle. Thus, the core glass 1, after it has been drawn from the central nozzle is coated with the second kind of glass 2 to form an outer layer coating or sheath integral with the core glass, and the glasses thus combined are both constricted while they are axially advanced and stretched by means of a pair or rollers 14 so that a glass fiber 3 of a desired diameter is thereby obtained.

It is widely known that the speed of diffusion of ions through the boundary surface between the two kinds of glasses is faster when the ions consist of monovalent cations. On the other hand, for the realization of a desired distribution of the refractive index in the glass fiber for imparting thereto ample light-conducting characteristic, it is required that diffusion occur between at least two kinds of cations having a greater difference of electron polarization factor per unit volume, for instance, Tl ions and any one kind of ions selected from Li, Na, K, Pb, and Cs, as described in detail in U.S. Patent Application No. 806,368 filed on Mar. 12, 1969.

cordance with this invention, the diffusion coefficients of Tl ions in the core glass of the above described composition through the boundary surface between the core glass and the outer layer coating the core glass at various temperature were experimentally determined. The results are indicated in the following Table 1.

Table 1

| Temperature | Viscosity of core glass | Diffusion coefficient of Tl ions |
| --- | --- | --- |
| 900(°C) | $10^{4.2}$ (poise) | $2 \times 10^{-6}$ (cm²/sec) |
| 1000 | $10^{3.5}$ | $4 \times 10^{-6}$ |
| 1100 | $10^{2.9}$ | $8 \times 10^{-6}$ |
| 1200 | $10^{2.5}$ | $1 \times 10^{-5}$ |

The contacting periods of the core glass and the outer layer glass of the above described compositions for spinning a focusing light-conducting glass fiber from these glasses in molten conditions, are indicated in the following Table 2 for various temperatures.

Table 2

| Temperature | Contacting period | |
| --- | --- | --- |
| | When an annular nozzle having an inner diameter of 3 mm and an inner tip diameter of 1.5mm is used. | When an annular nozzle having an inner diameter of 2 mm and an inner tip diameter of 1.0 mm is used. |
| 900(°C) | 6 min. | 3 min |
| 1000 | 3 | 1.5 |
| 1100 | 2 | 1.0 |
| 1200 | 1.5 | 0.8 |

Figure 2A:
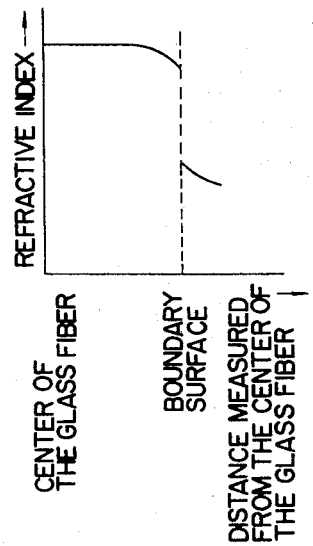
FIGS. 2(a) and 2(b) are graphical representations of distributions of refractive indexes in glasses obtained during the process for producing the light-conducting fiber according to the present invention.
Figure 2B:
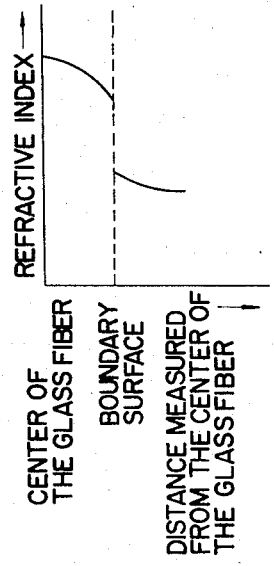

In FIGS. 2(a) and 2(b), there are indicated examples of distributions of the refractive index obtained at different stages of the mutual diffusions of cations. FIG. 2(a) represents a distribution of refractive index in the glass fiber at an initial instant when the two kinds of glasses in molten state are brought into contact with each other, the distribution being calculated on the basis of the rate of diffusion of the cations. FIG. 2(b) represents an actually measured distribution of refractive index in a preferred example of the glass fiber after the completion of the diffusion step. The distribution indicated in FIG. 2(b) is substantially a parabolic distribution satisfying the equation $$n = n_o (1 - ar^2)$$

wherein, $n$ is the refractive index at any point, $n_o$ is the refractive index at the center of the glass fiber, $r$ is the distance from the center of the glass fiber to said point, and $a$ is a positive constant. A glass fiber having such a distribution of refractive index is highly useful as a transmission path in light-communication or as a novel lens-effect structure in optical or information-processing techniques.

In the cross sectional plane of said glass fiber the concentration of ions having a greater contribution to the refractive index, for instance the concentration of thallium ions, decreases gradually from the center toward the periphery, and the concentration of ions having a less contribution to the refractive index, for instance the concentration of alkaline metal ions, increases gradually from the center toward the periphery. And, the concentrative distribution of said both ions forms said refractive distribution.

For the purpose of determining the required working conditions for obtaining a light-conducting glass fiber having a parabolic distribution of refractive index in ac- In order to carry out a steady spinning of the glass fiber while the required diffusion of ions is obtained, the depth of the tip of the central nozzle relative to the tip of the outer annular nozzle, in other words, the axial length of the reduced diameter portion of the annular nozzle, when the upper or root end of the reduced diameter portion thereof is in the same plane as the tip of the central nozzle, should be appropriately selected. For instance, when an outer pot having an inner diameter reduced to 3 mm and an inner tip of 1.5 mm is employed, the focusing light-conducting glass fiber can be stably spun at a temperature in the vicinity of 900°C, with a length of the reduced diameter portion of the outer annular nozzle of 9 mm. If the spinning speed of the glass fiber is selected at 8.5 cm/min., a glass fiber having an outer diameter of 0.4 mm and an inner diameter of 0.2 mm can be obtained.

As another example, when an outer pot narrowed into an annular nozzle having an inner diameter of 2.0 mm and an inner tip diameter of 1.0 mm is employed, a focusing light-conducting glass fiber of 0.4 mm outer diameter and 0.2 mm inner diameter and 0.2 mm inner diameter can be stably spun at 1,000°C and at a spinning speed of 9.2 cm/min with a length of the reduced diameter portion of the outer nozzle of 11 mm.

In glass fibers of all cases, the refractive index of the cross-sectional plane near the center, namely in the central portion having a diameter of 15 microns, satisfied said formula, when $a$ is the constant a value of 0.63 mm$^{-2}$.

We claim:

1. A process for continuously producing a light-conducting glass fiber having a refractive index distribution throughout its length in a plane perpendicular to the fiber optical axis progressively decreasing from the optical axis of the fiber to the periphery of the fiber comprising: providing both a first melted glass having a given uniform refractive index and having uniformily dispersed therein first ions which contribute to a greater degree to the refractive index of glass and a second melted glass having a uniform refractive index different from said given refractive index and having uniformly dispersed therein second ions which contribute to a lesser degree to the refractive index of glass and which are mutually exchangeable with said first ions; continuously flowing said melted glass along a path of travel while constricting the glass flow to form a continuous elongated core of said first melted glass originating at a given location along said path of travel; continuously flowing said second melted glass around and in contact with the periphery of said continuous core to form a sheath therearound while constricting the flow of both of said core and sheath for an axial length extending axially donwstream from said given location a distance long enough to effect sufficient diffusion of some of said first ions during flow of said core and sheath within said axial length outwardly from said core into said sheath coincidently with diffusion of some of said second ions inwardly from said sheath into said core to impart to the core and sheath composite throughout its length a refractive index distribution in a plane perpendicular to the longitudinal composite axis progressively decreasing from said composite axis toward the composite periphery due to both a progressively decreasing concentration of said first ions from said composite axis to said composite periphery and a progressively decreasing concentration of said second ions from said composite periphery to said composite axis; and continuously stretching said core and sheath composite into a glass fiber having a refractive index distribution throughout its length in a plane perpendicular to the fiber optical axis progressively decreasing from the optical axis of the fiber to the periphery of the fiber.

2. A process according to claim 1, wherein first ions comprise Tl ions and said second ions comprise at least one kind of ions selected from the group consisting of Li, Na, K, Rb, and Cs ions.

3. A process according to claim 1; wherein said axial length within which both said core and sheath are constricted is more than 5 mm in length.

4. A process according to claim 1; wherein said axial length within which both said core and sheath are constricted is of a sufficient length to impart a refractive index distribution to said glass fiber which decreases from the fiber optical axis to the fiber periphery in proportion to the square of the radial distance outwardly from the fiber optical axis.

5. A process according to claim 1; wherein said axial length within which both said core and sheath are constricted is of a sufficient length to maintain the refractive index of the fiber optical axis at the refractive index value of that of said first melted glass.

* * * * *